(12) United States Patent
Dennis

(10) Patent No.: US 8,805,842 B2
(45) Date of Patent: Aug. 12, 2014

(54) METHOD FOR DISPLAYING SEARCH RESULTS

(75) Inventor: Simon John Dennis, Columbus, OH (US)

(73) Assignee: Her Majesty the Queen in right of Canada, as represented by the Minister of National Defence, Ottawa, Ontario (CA)

( * ) Notice: Subject to any disclaimer, the term of this patent is extended or adjusted under 35 U.S.C. 154(b) by 49 days.

(21) Appl. No.: 13/435,485

(22) Filed: Mar. 30, 2012

(65) Prior Publication Data

US 2013/0262442 A1    Oct. 3, 2013

(51) Int. Cl.
   *G06F 17/30*   (2006.01)

(52) U.S. Cl.
   USPC .......................... 707/737; 715/853

(58) Field of Classification Search
   USPC .......................... 707/737; 715/853
   See application file for complete search history.

(56) References Cited

U.S. PATENT DOCUMENTS

| | | | |
|---|---|---|---|
| 4,839,853 A | 6/1989 | Deerwester et al. | |
| 5,301,109 A | 4/1994 | Landauer et al. | |
| 5,767,854 A | 6/1998 | Anwar | |
| 6,298,174 B1 | 10/2001 | Lantrip et al. | |
| 6,750,864 B1 | 6/2004 | Anwar | |
| 7,043,500 B2 | 5/2006 | Leary | |
| 7,250,944 B2 | 7/2007 | Anderson et al. | |
| 7,352,371 B2 | 4/2008 | Gallivan | |
| 7,714,859 B2 | 5/2010 | Shoemaker et al. | |
| 2004/0083206 A1* | 4/2004 | Wu et al. ......................... | 707/3 |
| 2004/0172600 A1 | 9/2004 | Evans | |
| 2004/0196287 A1 | 10/2004 | Wong et al. | |
| 2006/0117067 A1 | 6/2006 | Wright et al. | |
| 2007/0171716 A1 | 7/2007 | Wright et al. | |
| 2008/0180446 A1 | 7/2008 | Gallivan | |
| 2008/0198159 A1 | 8/2008 | Liu et al. | |
| 2008/0263022 A1* | 10/2008 | Kostorizos et al. ................ | 707/5 |
| 2008/0276201 A1* | 11/2008 | Risch et al. ..................... | 715/853 |
| 2010/0169327 A1* | 7/2010 | Lindsay et al. ................. | 707/750 |
| 2010/0325650 A1* | 12/2010 | Ellis et al. ......................... | 725/25 |

FOREIGN PATENT DOCUMENTS

| | | |
|---|---|---|
| WO | PCT/US03/039356 A2 | 6/2004 |
| WO | PCT/US2010/032420 A1 | 4/2010 |

OTHER PUBLICATIONS

A. McCallum et al., "The Author-Recipient-Topic Model for Topic and Role Discovery in Social Networks: Experiments with Enron and Academic Email", Tehcnical Report UM-CS-2004-096, 2004.

T. Landauer et al., "Introduction to Latent Semantic Analysis", Discourse Processes, 25, 1998, 259-284.

(Continued)

*Primary Examiner* — Cam Truong
(74) *Attorney, Agent, or Firm* — Oliff PLC; R. Brian Drozd

(57) ABSTRACT

Methods and systems for presenting document search results to a user. A user enters search terms to be matched with indicators mentioned in documents from a specific corpus of documents. The search results, which are the documents with indicators or content that match the search terms, are provided to the user using a user interface. Each document in the search results are represented by a marker on a map in the user interface. Other indicators which appear with the searched for indicators in the documents are also mapped to the user interface. Documents with similar indicators in their content are clustered together in the map and the markers which represent them are color coded to differentiate them from markers belonging to other clusters.

12 Claims, 6 Drawing Sheets

(56) References Cited

OTHER PUBLICATIONS

S. Deerwester et al., "Indexing by latent semantic analysis", Journal of the Society for Information Science, 41(6), 1990, 391-407.

S. Dumais et al., "Using latent semantic analysis to improve information retrieval", Proceedings of CHI'88: Conference on Human Factors in Computing, New York: ACM, 1988, 281-285.

S. Dumais, "Improving the retrieval of information from external sources", Behaviour Research methods, Instruments and Computers, 23(2), 1991, 229-236.

S. Dumais and D. Schmitt, "Iterative searching in an online database", Proceedings of Human Factors Society 35th Annual Meeting, 1991, 398-402.

S. Dumais and J. Nielsen, "Automating the assignment of submitted manuscripts to reviewers", In: N. Belkin et al., SIGIR'92: Proceedings of the 15th Annual International ACM SIGIR Conference on Research and Development in Information Retrieval, ACM Press, 1992, 233-244.

P. Foltz and S. Dumais, "Personalized information delivery: An analysis of information filtering methods", Communications of the ACM, 35(12), 1992, 51-60.

S. Dumais, "LSI meets TREC: A status report", In: D. Harman, The First Text Retrieval Conference (TREC1), National Institute of Standards and Technology Special Publication 500-207, 1993, 137-152.

S. Dumais, "Latent Semantic Indexing (LSI) and TREC-2", In: D. Harman, The Second Text Retrieval Conference (TREC2), National Institute of Standards and Technology Special Publication 500-215, 1994, 105-116.

S. Dumais, "Using LSI for information filtering: TREC-3 experiments", In: D. Harman, The Third Text Retrieval Conference (TREC3) National Institute of Standards and Technology Special Publication, 1995.

M. Berry et al., "Using linear algebra for intelligent information retrieval", SIAM Review, 37(4), 1995, 573-595.

W. Caid et al., "Learned vector space models for information retrieval", Information Processing and Management, 31 (3), 1995, 419-429.

S. Dumais, "Combining evidence for effective information filtering", AAAI Spring Symposium on Machine Learning and Information Retrieval, Tech Report SS-96-07, AAAI Press, 1996.

M. Rosenstein and C. Lochbaum, Recommending from content: preliminary Results from an E-Commerce Experiment, Proceedings of CHI'00: Conference on Human Factors in Computing, The Hague, The Netherlands: ACM, 2000.

C. Chen et al., "Telecordia LSI Engine: Implementation and Scalability Issues", Proceedings of the 11th Int. Workshop on Research Issues in Data Engineering: Document Management for Data Intensive Business and Scientific Applications, Heidelberg, Germany, 2001.

D. Bassu and C. Behrens, "Distributed LSI: Scalable Concept-based Information Retrieval with High Semantic Resolution", Proceedings of the 3rd SIAM International Conference on Data Mining (Text Mining Workshop), San Francisco, CA, 2003.

T. Landauer and M. Littman, "Fully automatic cross-language document retrieval using latent semantic indexing", Proceedings of the Sixth Annual Conference of the UW Centre for the New Oxford English Dictionary and Text Research, Waterloo, Ontario, 1990.

S. Dumais et al., "Automatic cross-linguistic information retrieval using Latent Semantic Indexing", SIGIR'96 Workshop on Cross-Linguistic Information Retrieval, 1996,16-23.

S. Dumais et al., "Automatic cross-language retrieval using Latent Semantic Indexing", AAAI Spring Symposium on Cross-Language Text and Speech Retrieval, 1997.

M. Littman and G. Keim, "Cross-language text retrieval with three languages", NIPS'97, 1997.

K. Wittenburg and E. Sigman, "Integration of Browsing, Searching, and Filtering in an Applet for Web Information Access", CHI'97 Modeling Human Memory, 1997.

T. Landauer and S. Dumais, "Solution to Plato's Problem: The Latent Semantic Analysis Theory of Acquisition, Induction and Representation of Knowledge", Physchological Review, 104(2), 1997, 211-240.

S. Dumais, "Using LSI for information Retrieval, Information Filtering, and Other Things", Talk on Cognitive Technology Workshop, 1997.

L. Trefethen and D. Bau, Numerical linear algebra, Philidephia: Society for Industrial and Applied Mathematics, 1997.

J Demmel and W. Kahan, "Accurate singular values of bidiagonal matrices", Journal on Scientific and Statistical Computing, 11(5), 1990, 873-912.

G. Golub and W. Kahan, "Calculating the singular values and pseudo-inverse of a matrix", Journal of the Society for Industrial and Applied Mathematics: Series B, Numerical Analysis 2 (2), 1965, 205-224.

G. Golub et al., Matrix Computations, 3d ed., 1996.

GSL Team, "§13.4 Singular Value Decomposition", GNU Scientific Library, Reference Manual, 2007.

B. Halldor and S. Venegas, "A manual for EOF and SVD analyses of climate data", McGill University, CCGCR Report No. 97-1, Montreal, 1997, p. 52.

P. Hansen, "The truncated SVD as a method for regularization", BIT, 27, 1987, 534-553.

R. Horn and C. Johnson, "Matrix Analysis", s. 7.3, Cambridge University Press, 1985.

R. Horn and C. Johnson, "Topics in Matrix Analysis", Ch. 3, Cambridge University Press, 1991.

G. Strang, "Introduction to Linear Algebra", 3d ed., s. 6.7, Wellesley-Cambridge Press, 1998.

G. Stewart, "On the Early History of the Singular Value Decomposition", SIAM Review, 35(4), 1993, 551-566.

M. Wall et al., "Singular value decomposition and principal component analysis", In: D. Berrer et al., A Practical Approach to Microarray Data Analysis, p. 91-109, Jun. 18, 2012.

J. Yang et al., "Visual Hierarchical Dimension Reduction for Exploration of High Dimensional Datasets", Joint Eurographics—IEEE TCVG Symposium on Visualization, The Eurographics Association, 2003.

\* cited by examiner

METHOD FOR DISPLAYING SEARCH RESULTS

TECHNICAL FIELD

The present invention relates to data searching. More specifically, the present invention relates to methods and devices for presenting data search results to a user while allowing the user to manipulate the search results.

BACKGROUND OF THE INVENTION

The task of the intelligence analyst is an unenviable one. Regardless of whether the intelligence sought is economic, political, military, or gossip-oriented, the task remains the same: deriving useful intelligence data from available sources and collating that data into a meaningful result.

Most analysts (whether they are working for intelligence agencies, the military, or marketing firms, or media) rely on documents, reports, and even stories available from the publicly available media. To this end, intelligence analysts need to read and review hundreds if not thousands of documents. While reading these documents, analysts have to rely on notes, memory, and other means to map out relationships, contexts, and entities mentioned in these documents. Clearly, this is a Herculean task.

It would greatly assist an analyst if entities, concepts, or ideas mentioned together in a document are mapped together. An analyst searching for a specific search term in a multitude of documents would be greatly helped if he or she knew what other terms are linked to that search term in the documents. Normally, as noted above, the intelligence analyst would need to read and digest volumes of documents to obtain the necessary knowledge of the various entities, concepts, or ideas associated with a specific search term in the documents.

To this end, some work has been performed in assisting with the derivation of useful data from documents. Communications between individuals is one of the best sources of information and a study was made in 2004 that analyzed the communications between people within strictly defined confines such as the company Enron (McCallum, A., Corrada-Emmanuel, A., and Wang, X. (2004). The Author-Recipient-Topic Model for Topic and Role Discovery in Social Networks: Experiments with Enron and Academic Email. Technical Report UM-CS-2004-096, 2004.) However, this study did not include an analysis of the content of the communications but merely the author-recipient and topic of the communications.

To date, there does not seem to be any tools available that would assist the analyst in the tasks mentioned above. There is therefore a need for tools that can, preferably, automate some of the tasks mentioned above and hopefully alleviate the workload for analysts.

SUMMARY OF INVENTION

The present invention provides methods and systems for presenting document search results to a user. A user enters search terms to be matched with indicators mentioned in documents from a specific corpus of documents. The search results, which are the documents with indicators or content that match the search terms, are provided to the user using a user interface. Each document in the search results are represented by a marker on a map in the user interface. Other indicators which appear with the searched for indicators in the documents are also mapped to the user interface. Documents with similar indicators in their content are clustered together in the map and the markers which represent them are color coded to differentiate them from markers belonging to other clusters. Other indicators occurring in the various documents found in the search results are represented by identifiers in the user interface and markers representing documents which have those indicators are clustered around the specific identifiers.

In a first aspect, the present invention provides a method for displaying document search results to a user, the method comprising the steps of:
a) receiving at least one search indicator;
b) searching a plurality of documents for instances of said at least one search indicator;
c) determining other indicators which occur with said at least one search indicator in documents found in step b);
d) representing each document found in step b) with a marker and displaying markers for said documents on a user interface;
e) on said user interface, clustering together markers for documents containing similar indicators to form at least one specific cluster of markers; and
f) providing the or each specific cluster with an identifier visible to said user on said user interface.

In a second aspect, the present invention provides computer readable media having encoded thereon computer readable instructions which, when executed, implements a method for displaying document search results to a user, the method comprising the steps of:
a) receiving at least one search indicator;
b) searching a plurality of documents for instances of said at least one search indicator;
c) determining other indicators which occur with said at least one search indicator in documents found in step b);
d) representing each document found in step b) with a marker and displaying markers for said documents on a user interface;
e) on said user interface, clustering together markers for documents containing similar indicators to form at least one specific cluster of markers; and
f) providing the or each specific cluster with an identifier visible to said user on said user interface.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
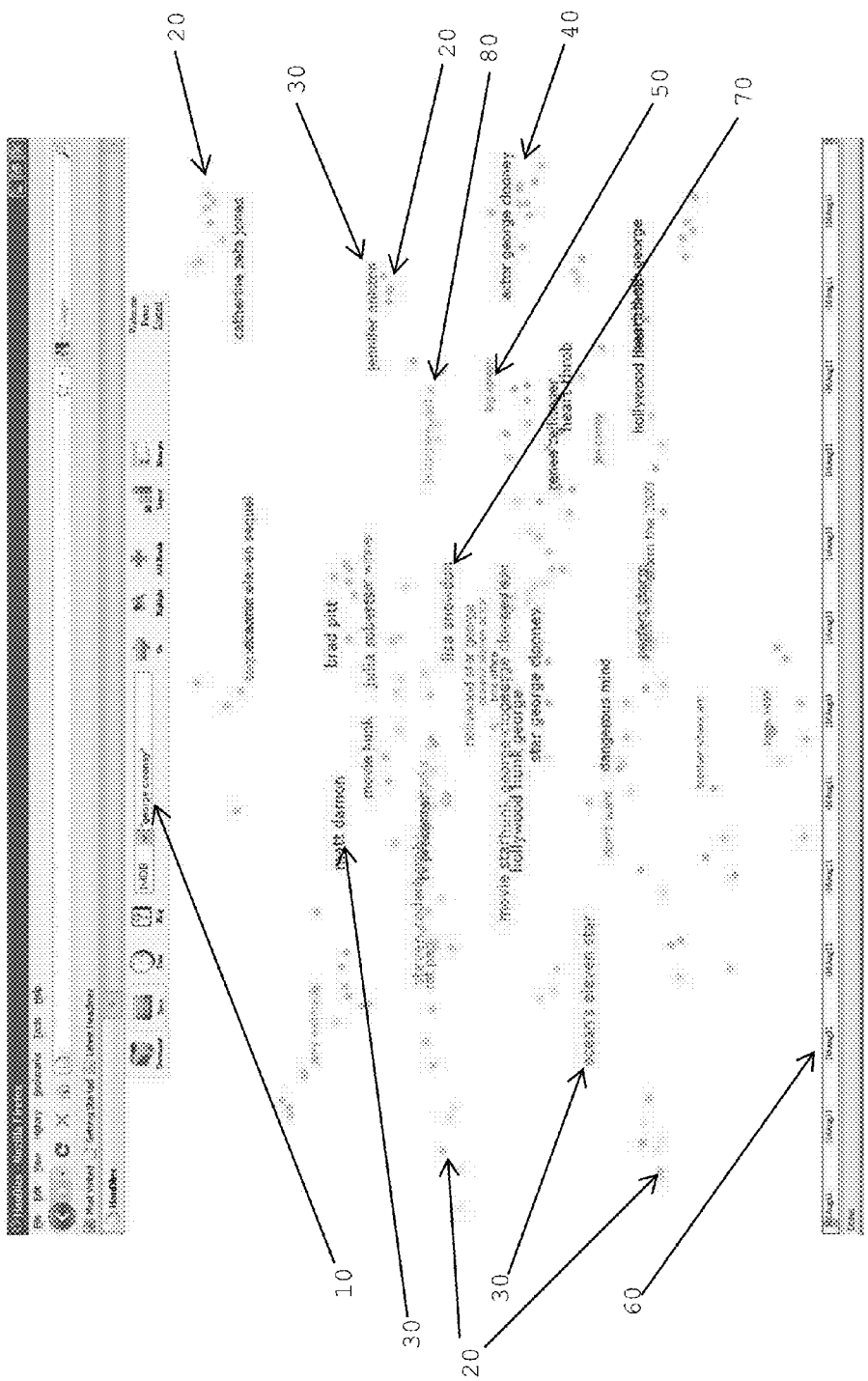
FIG. 1 illustrates a user interface according to one aspect of the invention.

Referring to FIG. 1, an illustration of a user interface according to one aspect of the invention is illustrated. As can be seen, an Internet browser implementation of one aspect of the invention is illustrated. The user interface 5 has a search space 10 where a user can enter search terms (or search indicators) to be searched for in a corpus of documents. In the example illustrated in FIG. 1, the corpus of documents consists of the Internet based IMDB™ database of documents. In the example, a search is made for document containing the search string "George Clooney". The search results (i.e. the documents from the database which contain the compound term "George Clooney") are represented on the user interface with markers 20. Each marker represents a single document that contains the search term or terms.

Also illustrated in the user interface are identifiers of other indicators or terms that occur with the search indicator found in that document. These other indicators are identified with identifiers 30 on the user interface. As examples, the indicators for the terms "Jennifer Aniston", "Matt Damon", and "Ocean's Eleven star" are identified by their associated identifiers on the user interface. While the identifiers in the example in FIG. 1 are simply the indicators themselves, other types or forms of identifiers may also be used. As can be seen, markers for documents containing the same indicators are also color coded. As an example, the markers for documents containing the indicator "matt damon" are colored purple and the identifier for that same indicator is also colored purple.

Another feature illustrated in the sample user interface of FIG. 1 is the clustering of markers representing documents containing similar indicators. As an example, a cluster of markers containing the indicators "actor george clooney" are indicated by reference numeral 40. The appearance of a specific run or uninterrupted series of terms in a number of documents may cause these documents to be clustered together under a specific indicator composed of these series of terms. The indicators "actor George Clooney" is one such example. Since the series of terms "actor George Clooney" frequently appears in a number of search results, then this series of terms can be automatically created as a single indicator and the markers for documents containing this indicator can be clustered together. Other clusters are also indicated in the user interface.

The potential relevance of each other indicator found in a document with the search indicators is also represented in the user interface as potentially more relevant indicators are indicated by the size of the font of their identifiers. As an example, the identifier 50 for the indicator "big screen" is shown in smaller font than the identifier for the indicators "actor george clooney" near the cluster 40. Font size can be used to indicate the frequency that an indicator appears in the search results. A higher frequency of appearance in the search results can be represented by a larger font used for the identifier representing the indicator. Thus, in FIG. 1, this means that the indicator "big screen" occurs less frequently than the indicator "actor George Clooney" as identifier for "big screen" is in a smaller size font than the identifier for "actor George Clooney".

The user interface also has a timeline 60 which can be used to order the search results. By sliding the timeline indicator at the bottom of the screen, the markers for documents which were produced outside the timeline are not shown on the user interface.

Figure 2:
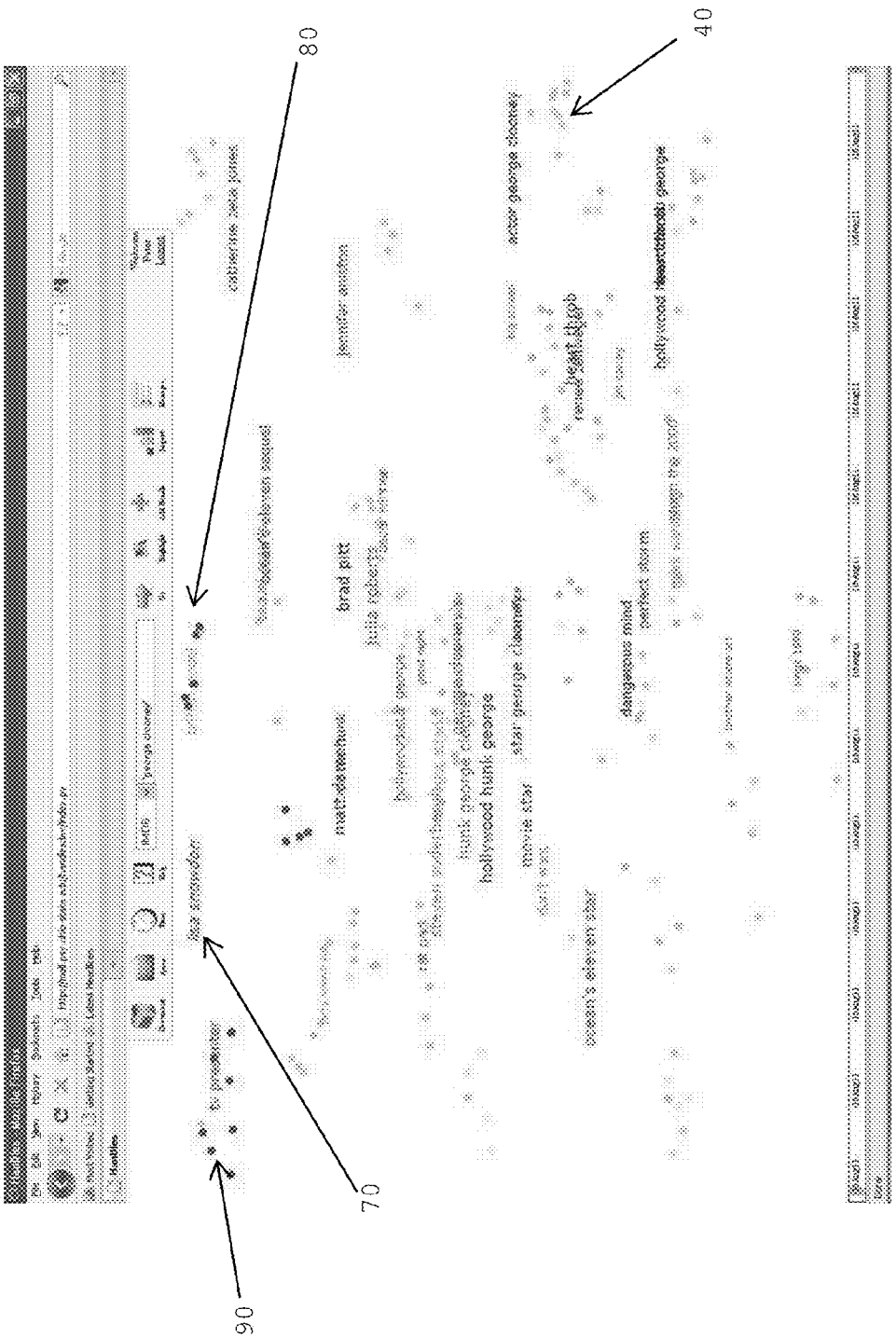
FIG. 2 shows the user interface of FIG. 1 illustrating another aspect of the invention.

Referring to FIG. 2, another aspect of the invention is illustrated, that of dragging and moving an identifier of an indicator found in the search results. By comparing FIG. 1 and FIG. 2, it can be seen that the identifier "lisa snowdon" 70 has been moved from approximately the middle of the screen (see FIG. 1) to the upper left section of the screen (see FIG. 2). It should be noted that not only was the identifier "lisa snowdon" moved but other identifiers (e.g. the identifier "british model" 80) have moved as well. More importantly, markers for documents associated with the moved identifier "lisa snowdon" moved as well. The user merely has to tag/identify the identifier of interest and drag that identifier to another part of the user interface. By doing so, the markers for documents associated with the dragged identifier are also dragged with the identifier. By effectively moving the markers for associated documents, the other identifiers associated with those moved markers also move as well. As an example, the cluster of markers 95 with the identifier "tv presenter" also moves with the "lisa snowdon" identifier as, clearly, the documents for the "tv presenter" identifier are also closely associated with the "lisa snowdon" identifier. Conversely, the cluster associated with the identifier "actor george clooney" 40 has hardly moved in FIG. 2 relative to its original position in FIG. 1. With this aspect of the invention, a user can drag an identifier from one part of the user interface to another part and, when doing so, markers for documents associated with that dragged identifier are also moved.

It should be noted that the cluster movement feature described above does not only apply to documents which contain a specific indicator. As an example, moving the identifier "tv presenter" also moves the identifier "lisa Snowdon" as well as the markers associated with those identifiers. It should be noted that these markers which are moved do not necessarily contain those specifically indicated indicators (in this case the indicators are "tv presenter" and "lisa Snowdon"). Markers for documents which are semantically related to the moved documents also move. Markers for documents which are semantically unrelated to the moved identifiers can either not move or be repelled (i.e. move away from) the moved identifiers.

Figure 3:
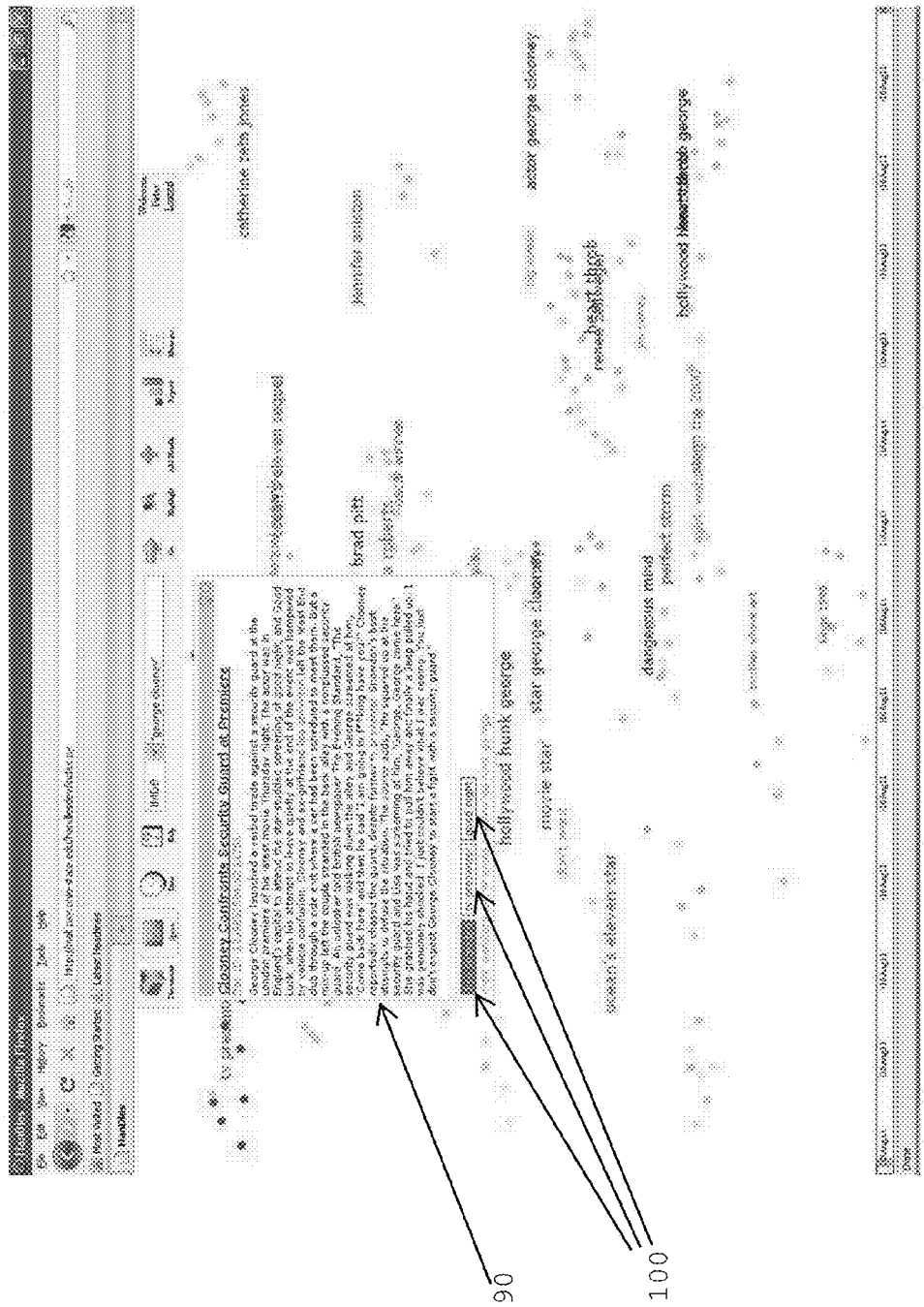
FIG. 3 is the user interface of FIG. 1 illustrating yet another aspect of the invention.

Referring to FIG. 3, another feature of the invention is illustrated. A user can activate any marker on the user interface. This opens up a window 90 that contains the textual contents of the document represented by the activated marker. As can be seen in FIG. 3, the indicators in the document which are represented by identifiers on the user interface are highlighted when the window 90 is activated. In FIG. 3, the indicators "good night", "lisa snowdon", and "tv presenter" are highlighted. The search indicator "george clooney" is not highlighted in the window 90 as all the documents represented on the user interface should have this indicator, given that the documents presented are the search results for that same indicator. For ease of reference, within the window 90 are the indicators 100 present and highlighted in the activated document. For further ease of reference, the indicators 100 in the window 90 are color coded with different indicators being colored differently from one another. The instances of those indicators in the document contents are also color coded such that the same color used to color the indicators 100 at the bottom of the window 90 are used to highlight those indicators in the document content. Also for ease of reference to the user, potential indicators 105 are also shown at the bottom of window 90. These potential indicators 105 (colored gray in FIG. 3) are indicators that could also be applied to or associated with the document.

It should be noted that multiple instances of the window 90 may be simultaneously active on the user interface. This can be done by activating multiple markers, thereby activating the multiple documents represented by those markers.

To determine which documents contain a specific search string, various searching engines may be used on the corpus of documents being searched. In one implementation, a well-known search engine known as Lucene was used to search the documents for search query strings. Other search engines may, of course, be used.

The system according to one aspect of the invention relies on LSA or Latent Semantic Analysis to analyze how documents are presented to a user such as how to position markers on the user interface. Latent Semantic Analysis analyzes the documents returned from a given query and determines the semantic representations of these search result documents. These semantic representations (or vectors) are then used to determine the placement of these documents' markers on the user interface as well as to determine how and which markers are moved relative to one another if an identifier is moved. LSA is thus used to automatically extract semantic, or meaning-based, information from the documents provided.

For reference to LSA, the following documents (which are hereby incorporated by reference herein) may be consulted:

Landauer, T. K., Foltz, P. W., & Laham, D. (1998). Introduction to Latent Semantic Analysis. *Discourse Processes, 25*, 259-284.

U.S. Pat. No. 4,839,853.

The following documents, also incorporated herein by reference, may be consulted for LSA as follows:

Deerwester, S., Dumais, S. T., Landauer, T. K., Furnas, G. W. and Harshman, R. A. (1990)—no figures, "Indexing by latent semantic analysis." Journal of the Society for Information Science, 41(6), 391-407.

Dumais, S. T., Furnas, G. W., Landauer, T. K. and Deerwester, S. (1988), "Using latent semantic analysis to improve information retrieval." In Proceedings of CHI '88: Conference on Human Factors in Computing, New York: ACM, 281-285.

Dumais, S. T. (1991), "Improving the retrieval of information from external sources." Behavior Research Methods, Instruments and Computers, 23(2), 229-236.

Dumais, S. T. and Schmitt, D. G. (1991), "Iterative searching in an online database." In Proceedings of Human Factors Society 35th Annual Meeting, 398-402.

Dumais, S. T. and Nielsen, J. (1992), "Automating the assignment of submitted manuscripts to reviewers." In N. Belkin, P. Ingwersen, and A. M. Pejtersen (Eds.), SIGIR '92: Proceedings of the 15th Annual International ACM SIGIR Conference on Research and Development in Information Retrieval. ACM Press, pp. 233-244.

Foltz, P. W. and Dumais, S. T. (1992)—html, "Personalized information delivery: An analysis of information filtering methods." Communications of the ACM, 35(12), 51-60.

Dumais, S. T. (1993), "LSI meets TREC: A status report." In: D. Harman (Ed.), The First Text REtrieval Conference (TREC1), National Institute of Standards and Technology Special Publication 500-207, pp. 137-152.

Dumais, S. T. (1994), "Latent Semantic Indexing (LSI) and TREC-2." In: D. Harman (Ed.), The Second Text REtrieval Conference (TREC2), National Institute of Standards and Technology Special Publication 500-215, pp. 105-116.

Dumais, S. T. (1995), "Using LSI for information filtering: TREC-3 experiments." In: D. Harman (Ed.), The Third Text REtrieval Conference (TREC3) National Institute of Standards and Technology Special Publication, in press 1995.

Berry, M. W., Dumais, S. T., and O'Brien, G. W. (1995). "Using linear algebra for intelligent information retrieval." SIAM Review, 37(4), 1995, 573-595.

Caid, W. R., Dumais, S. T. and Gallant, S. I. (1995), "Learned vector space models for information retrieval." Information Processing and Management, 31(3), 419-429.

Dumais, S. T. (1996), "Combining evidence for effective information filtering." In AAAI Spring Symposium on Machine Learning and Information Retrieval, Tech Report SS-96-07, AAAI Press, March 1996.

Rosenstein, M. and Lochbaum, C. (2000) "Recommending from Content: Preliminary Results from an E-Commerce Experiment." In Proceedings of CHI'00: Conference on Human Factors in Computing, The Hague, The Netherlands: ACM.

Chen, C., Stoffel, N., Post, N., Basu, C., Bassu, D. and Behrens, C. (2001) "Telcordia LSI Engine: Implementation and Scalability Issues." In Proceedings of the 11th Int. Workshop on Research Issues in Data Engineering (RIDE 2001): Document Management for Data Intensive Business and Scientific Applications, Heidelberg, Germany, Apr. 1-2, 2001.

Bassu, D. and Behrens, C. (2003) "Distributed LSI: Scalable Concept-based Information Retrieval with High Semantic Resolution." In Proceedings of the 3rd SIAM International Conference on Data Mining (Text Mining Workshop), San Francisco, Calif., May 3, 2003.

Landauer, T. K. and Littman, M. L. (1990) "Fully automatic cross-language document retrieval using latent semantic indexing." In Proceedings of the Sixth Annual Conference of the UW Centre for the New Oxford English Dictionary and Text Research, pp. 31-38. UW Centre for the New OED and Text Research, Waterloo Ontario, October 1990.

Dumais, S. T., Landauer, T. K. and Littman, M. L. (1996) "Automatic cross-linguistic information retrieval using Latent Semantic Indexing." In SIGIR '96—Workshop on Cross-Linguistic Information Retrieval, pp. 16-23, August 1996.

Dumais, S. T., Letsche, T. A., Littman, M. L. and Landauer, T. K. (1997) "Automatic cross-language retrieval using Latent Semantic Indexing." In AAAI Spring Symposuim on Cross-Language Text and Speech Retrieval, March 1997.

M. L. Littman, and G. A. Keim (1997) "Cross-language text retrieval with three Languages". Submitted to NIPS '97.

Wittenburg, K. and Sigman, E. "Integration of Browsing, Searching, and Filtering in an Applet for Web Information Access." CHI '97 Modeling Human Memory.

Landauer, T. K. and Dumais, S. T. (1977) "Solution to Plato's Problem: The Latent Semantic Analysis Theory of Acquisition, Induction and Representation of Knowledge." Psychological Review, 1997, 104 (2), 211-240.

Dumais, S. T. (1997) "Using LSI for Information Retrieval, Information Filtering, and Other Things". Talk at Cognitive Technology Workshop, Apr. 4-5, 1997.

"Computer information retrieval using latent semantic structure". U.S. Pat. No. 4,839,853, Jun. 13, 1989.

"Computerized cross-language document retrieval using latent semantic indexing". U.S. Pat. No. 5,301,109, Apr. 5, 1994.

To use LSA, each document in the search result documents is first scanned for different terms within them and semantic representations of each document are then created. This is done by:

a) creating a matrix containing the frequency with which each unique word (i.e. words carrying semantic information and therefore not articles such as "the" or "and") occurs across all the documents in the search result documents. For this matrix, each row would correspond to a word and each column would correspond to a document. The intersection of each column and row would contain the number of occurrences for that particular word in that particular document. It should be noted that this is done for each word carrying semantic information and not just for proper nouns;

b) Transforming each cell by taking the natural logarithm of each frequency, and then weighing each cell by a word's distribution across documents using Shannon's entropy metric;

c) apply Singular Value Decomposition (SVD) on the matrix to reduce the dimensionality of each word's vector; and d) When the original matrix is reconstructed using only the top 50-1000 singular values, each word's vector in the newly re-constructed (Term)×(Document) matrix is now a semantic representation of that word from the corpus. A vector representation for a particular document not appearing in the model's training corpus can therefore by created by simply summing together all the vectors for the words found in that document.

It should be noted that step b) above is not necessary to implement LSA. Implementations of the invention which do not use this step function very well. However, other implementations may choose to include this step.

Referring to step c) above, an explanation of Singular Value Decomposition may be found in these references (these references being hereby incorporated herein by reference):

Trefethen, Lloyd N.; Bau III, David (1997), Numerical linear algebra, Philadelphia: Society for Industrial and Applied Mathematics, ISBN 978-0-89871-361-9.

Demmel, James; Kahan, William (1990), "Accurate singular values of bidiagonal matrices", Society for Industrial and Applied Mathematics. Journal on Scientific and Statistical Computing 11 (5): 873-912, doi:10.1137/0911052.

Golub, Gene H.; Kahan, William (1965), "Calculating the singular values and pseudo-inverse of a matrix", Journal of the Society for Industrial and Applied Mathematics: Series B, Numerical Analysis 2 (2): 205-224, i:10.1137/0702016, http://www.jstor.org/stable/2949777.

Golub, Gene H.; Van Loan, Charles F. (1996), Matrix Computations (3rd ed.), Johns Hopkins, ISBN 978-0-8018-5414-9.

GSL Team (2007), "§13.4 Singular Value Decomposition", GNU Scientific Library. Reference Manual.

Halldor, Bjornsson and Venegas, Silvia A. (1997). "A manual for EOF and SVD analyses of climate data". McGill University, CCGCR Report No. 97-1, Montréal, Québec, 52 pp.

Hansen, P. C. (1987). The truncated SVD as a method for regularization. BIT, 27, 534-553.

Horn, Roger A. and Johnson, Charles R (1985). "Matrix Analysis". Section 7.3. Cambridge University Press. ISBN 0-521-38632-2.

Horn, Roger A. and Johnson, Charles R (1991). Topics in Matrix Analysis, Chapter 3. Cambridge University Press. ISBN 0-521-46713-6.

Strang G (1998). "Introduction to Linear Algebra". Section 6.7. 3rd ed., Wellesley-Cambridge Press. ISBN 0-9614088-5-5.

Stewart, G. W. (1993), "On the Early History of the Singular Value Decomposition", SIAM Review 35 (4): 551-566, doi:10.1137/1035134, http://citeseer.ist.psu.edu/stewart92early.html.

Wall, Michael E., Andreas Rechtsteiner, Luis M. Rocha (2003). "Singular value decomposition and principal component analysis". in A Practical Approach to Microarray Data Analysis. D. P. Berrar, W. Dubitzky, M. Granzow, eds. pp. 91-109, Kluwer: Norwell, MA.

Once each document's LSA vectors are determined, these vectors can be used to determine how to present and/or move a document's marker.

A document's raw vectors (i.e. each document's vector that shows which terms are found in that document) can be used to determine which identifiers to display on the user interface along with the search results. As an example, if an indicator (not the search indicator) is found in at least x documents in the search results, then that indicator can be displayed on the user interface with an identifier, x being an arbitrary or predetermined number. Thus, if x=10, all indicators which appear in at least 10 documents in the search results can be represented by their own identifiers on the user interface.

Similarly, a document's vectors can also be used to determine where to position its marker on the user interface. In one implementation, the number of instances of the search indicator in a document is used to determine how close that document's marker is to the center (or centroid) of the user interface. To place an identifier for a specific indicator on the user interface, the number of instances of the search indicator in the various documents that also have the specific indicator is summed. For each identifier representing a specific indicator, the larger the resulting number, the closer is the identifier to the center or centroid of the user interface. As an example, from FIG. 1, it should be clear that documents containing the indicator "hollywood star george" have more instances of the original search indicator than documents with the indicator "eleven sequel" as the identifier for "hollywood star george" is closer to the center than the identifier for "eleven sequel". In another implementation, the location for a marker for a document and the location for an identifier for an indicator are determined based on how alike their vectors are. Thus, if a document's vector is very alike or close to the vector for a specific indicator, then the marker for that document is placed closer to the identifier for that indicator.

It should be noted that the placement of an identifier on the user interface also affects the placement of markers representing documents containing the indicator represented by that identifier. The location of an identifier on the user interface becomes the center of the cluster of markers representing documents which have the indicator represented by the identifier. The number of instances of that indicator in a document can be used to determine where that document's marker is placed on the user interface with the higher the number of instances of that indicator in a document, the closer the location of the marker for that document to the identifier on the user interface.

It should be noted that if a document contains multiple indicators, the location of that document's marker may depend on the number of instances of each indicator. Thus, the marker for a document with three different indicators can be placed between three different centers or three different identifiers that represent those three indicators. The marker for this document would be placed closest to the identifier for the indicator with the largest number of instances in the document.

The color coding of the various markers also depends on the document that the marker represents. As noted above in relation to FIG. 1, markers are color coded based on which cluster each marker is associated with. Thus, as above, markers for documents with the indicator "matt damon" are colored purple. For documents containing multiple indicators, the color assigned to the markers for those documents depends on which indicator has the strongest relationship with a specific document. As an example, if a document has the indicators "matt damon" and "Jennifer aniston", then the indicator to which the document relates more (e.g. has more instances of a specific indicator), is the one which associates its color with the marker. If, as in the example, a document has 5 instances of the indicator "matt damon" yet only has 3 instances of the indicator "Jennifer aniston", then the marker for this document will be given the color associated with the indicator "matt damon". To assist a user, if a document has been "clicked" or activated and the contents have been shown to the user, then the color for that document's marker may be turned into a specific color (e.g. red) regardless of the marker's original color so that a user will know which documents he or she has viewed.

The movement of an identifier, as noted above, also moves the markers associated with it. If an identifier is moved by a user, that identifier's position, relative to its associated markers, is preserved. Thus, if a moved identifier (e.g. cluster A) is also associated to a lot of markers which are also associated to an unmoved identifier (e.g. cluster B), then all the markers associated will move as well. This could, effectively, also move the unmoved identifier (cluster B).

This relative effect can be seen in relation to FIGS. 1 and 2. In FIG. 2, the moving of identifier "lisa snowdon" effectively moves another identifier "tv presenter" but does not move identifier "actor george clooney". This effectively identifies the concepts of "lisa Snowdon" and "tv presenter" as being tied to one another. As well, it identifies a possibly small correlation between the concepts "lisa snowdon" and "tv presenter" and the concept of "actor george clooney".

The placement of the various markers and identifiers on the user interface is based on a projection of a multidimensional object on to a 2D surface. Since each cluster is a multidimensional object with the identifier being at the center of a cluster, moving an identifier effectively changes a user's view of that multidimensional object. Moving an identifier therefore moves the markers of all documents which are related or associated with that identifier. Of course, markers of documents which are not related or associated with the moved identifier do not move.

In one variant, the above moving identifier feature can be effected by applying transformations to the locations of markers. When a user moves an identifier, a geometric transformation is applied to the Cartesian coordinates of the location of that identifier. By applying a similar transformation to the Cartesian coordinates of the markers associated with the moving identifier, the position of the associated markers relative to the position of the moved identifier is preserved. Of course, moving markers may also affect other identifiers. If an identifier moves, its associated markers move and this may cause other identifiers (and their associated markers) to move as well.

It should be noted that an indicator and its associated marker on the user interface may be defined by the documents which relate to that indicator. The LSA vectors for the documents which contain that indicator are summed to arrive at the representation for that indicator. To determine where to place a marker for a document or an identifier for an indicator on the user interface, a multidimensional scaling process is applied to vectors for all the search query documents and all the indicators found. The scaling process determines the similarity between the vectors for a document and a specific indicator. The more similar are the vectors for the indicator and the document, then the closer is the placement of the marker for that document to the identifier for that indicator.

The multidimensional scaling (MDS) process used for one implementation of the invention is a variation on classical multidimensional scaling constrained to be a projection of the original semantic space. As noted above, MDS can be used for displaying the various markers and identifiers on the user interface. In classical MDS, we start with the inner products matrix $$B = XX^T \text{ where } X \text{ is the matrix of locations}$$

B can be rewritten in terms of the distances between the points which are given (see equation below).

$$b_{ij} = -\frac{1}{2}\left(d_{ij}^2 - n^{-1}\sum_{j=1}^{n} d_{ij}^2 - n^{-1}\sum_{i=1}^{n} d_{ij}^2 - n^{-2}\sum_{i=1}^{n}\sum_{j=1}^{n} d_{ij}^2\right).$$

The usual classical MDS procedure would be to find the eigenvectors of B. Taking the SVD of B would give:

$$B = VLV^T$$

where L is a diagonal matrix whose entries are the squares of the eigenvalues.

Now $X = V L^{\{1/2\}}$ provides the required locations.

In the projection variation of MDS, $X = M P$ where M is a fixed set of the document vectors and P is the projection matrix which is what we want to find. Consequently, $$B = MP(MP)^T$$

So, instead of finding the eigenvectors of B we take the eigenvectors of:

$$M\_\text{left}^{-1} B (M^T)\_\text{right}^{-1}$$

where $M\_\text{left}^{-1}$ is the left inverse of M and $(M^T)\_\text{right}^{-1}$ is the right inverse of the transpose of M. The left inverse can be seen as follows:

$$M\_\text{left}^{-1} = (MM^T)^{-1} M^T$$

presuming M is full rank and similarly for the right inverse.

From the above, the projection matrix would be:

$$P = VL^{\{1/2\}}$$

using these eigenvectors and values.

Figure 4:
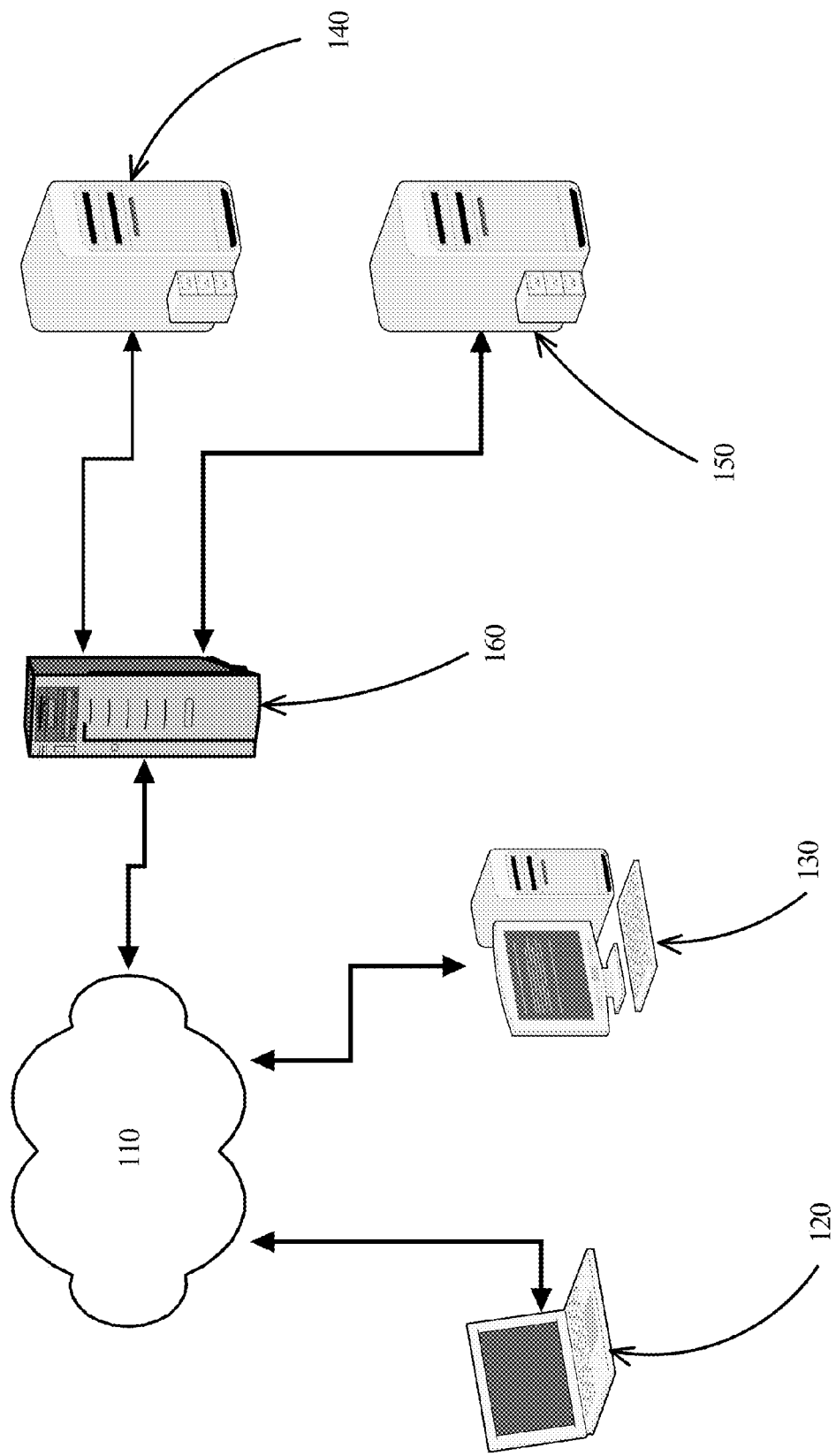
FIG. 4 shows a system on which the invention may be practiced.

In one implementation, the invention may be practiced in a system as detailed in FIG. 4. A network 110 connects user computer 120 and user computer 130 to document database server 140, 150 through server 160. The document database servers 140, 150 may contain different types of documents or may have databases for different users. As an example, database 140 may have documents relating to science and technology and may be used by researchers while database 150 may have intelligence reports, newspaper articles, and magazine articles to be used by intelligence analysts.

Server 160 acts as the search engine and analyzes the data and documents from the database servers 140, 150. The server 160 retrieves documents and document contents from database servers 140, 150, performs LSA on the documents, and provides the user computer 120, 130 with the graphics data to display the user interface and the search results to the user.

Figure 5:
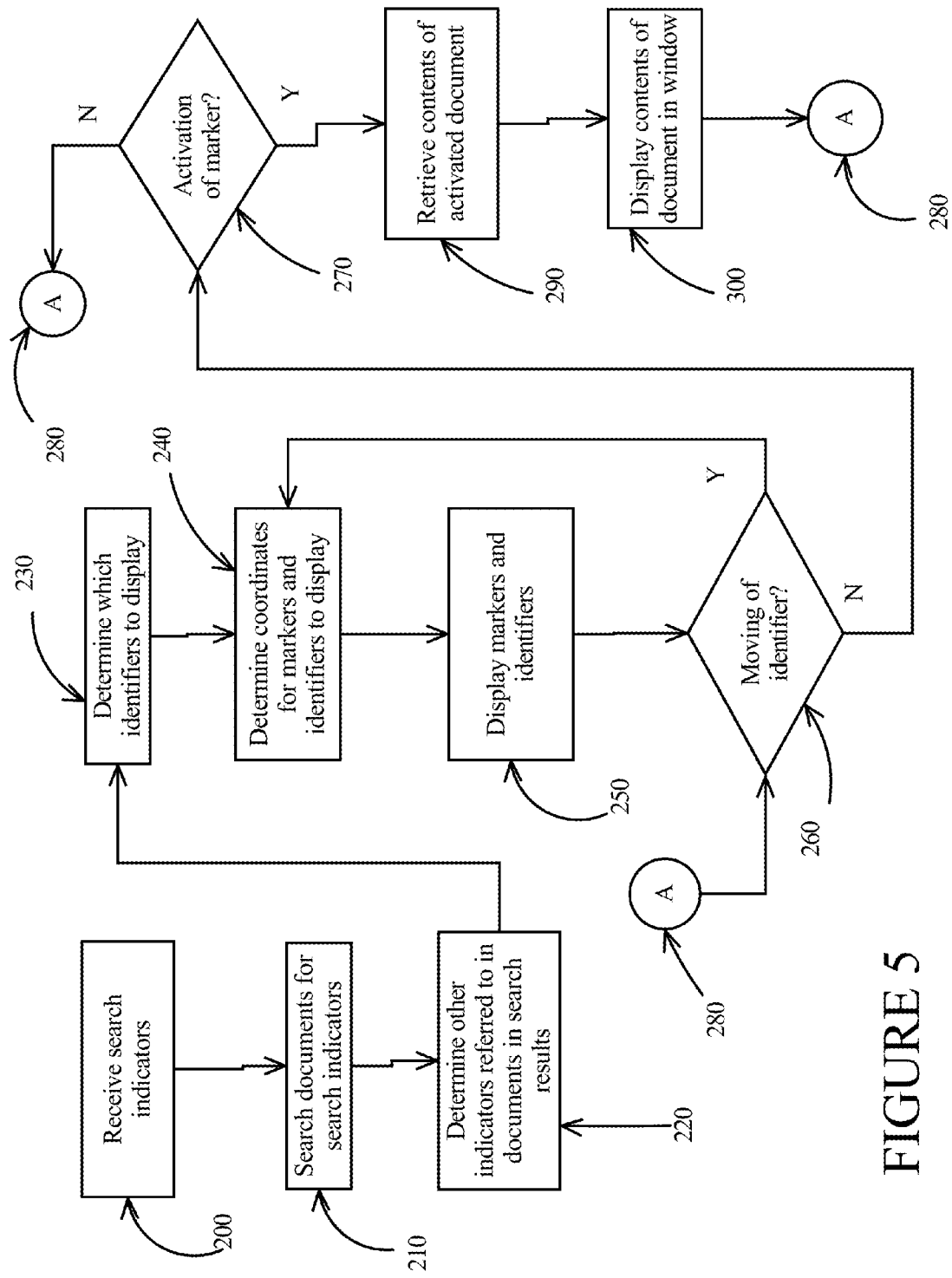
FIG. 5 illustrates a flowchart detailing the steps in a method according to another aspect of the invention.

Referring to FIG. 5, a flowchart of a method according to another aspect of the invention is illustrated. The process begins at step 200, that of receiving search indicators. Search indicators are terms or a term that a user wishes to locate in a corpus or body of documents. Once the search indicators have been received, the documents are then searched to determine which documents contain the search indicators (step 210). This can be done by searching the documents to determine if, and how many times, the document contains the search indicators. If a document contains the search indicators, that document can be flagged as being part of the search results.

The next step in the process is that of determining which other indicators are contained in each of the documents in the search results (step 220). This step may involve searching and flagging each other indicator in each document.

Once the other indicators for each document have been determined, a determination then has to be made as to which indicators are to be represented by an identifier in the user interface (step 230). The frequency of an indicator in the search results can be determined and only the most frequently referred indicators are represented by an identifier in the user interface.

Step 240 is that of determining the coordinates for displaying the relevant identifiers and markers on the user interface after it has been determined which identifiers are to be displayed. This step involves applying a multidimensional scaling algorithm or process on the search result documents (to determine the location of the documents' markers) as well as on the identified indicators (to determine the location of the indicators' identifiers).

The markers and identifiers are then displayed on the user interface (step 250).

Decision 260 checks to see if the user has moved an identifier to another part of the user interface. If an identifier has been moved, then steps 240 and 250 are re-executed to ensure that all affected markers and identifiers are also moved. As noted above, markers and identifiers are affected if a moved identifier is associated with specific markers and if those specific markers are further associated with other identifiers.

In the event a moved identifier is not detected, then decision 270 determines if the user has activated a marker. If a marker has not been activated, then connector 280 shows that the logic flow of the process returns to decision 260. As can be seen, decisions 260, 270, and connector 280 form a loop to continuously check to see if either a user moves an identifier or if a user activates a marker. Of course, a user may also simply enter new search indicators to thereby restart the process.

If the user has activated a marker, then the logic flow of the process moves to step 290, that of retrieving the contents of the activated document. The contents may be retrieved from one of the document servers illustrated in FIG. 4 or it may be cached by the server 160. As part of this step, the retrieved content may be further processed to highlight indicators in the content, format the content such that highlighting conforms to the color scheme used for the various identifiers, as well as any other processing which may be required to display the content to the user in a meaningful manner.

Step 300 is that of actually displaying a document's content to the user (see FIG. 3 for an example). After the content is displayed in an active window, connector 280 moves the logic of the process back to decision 260.

Figure 6:
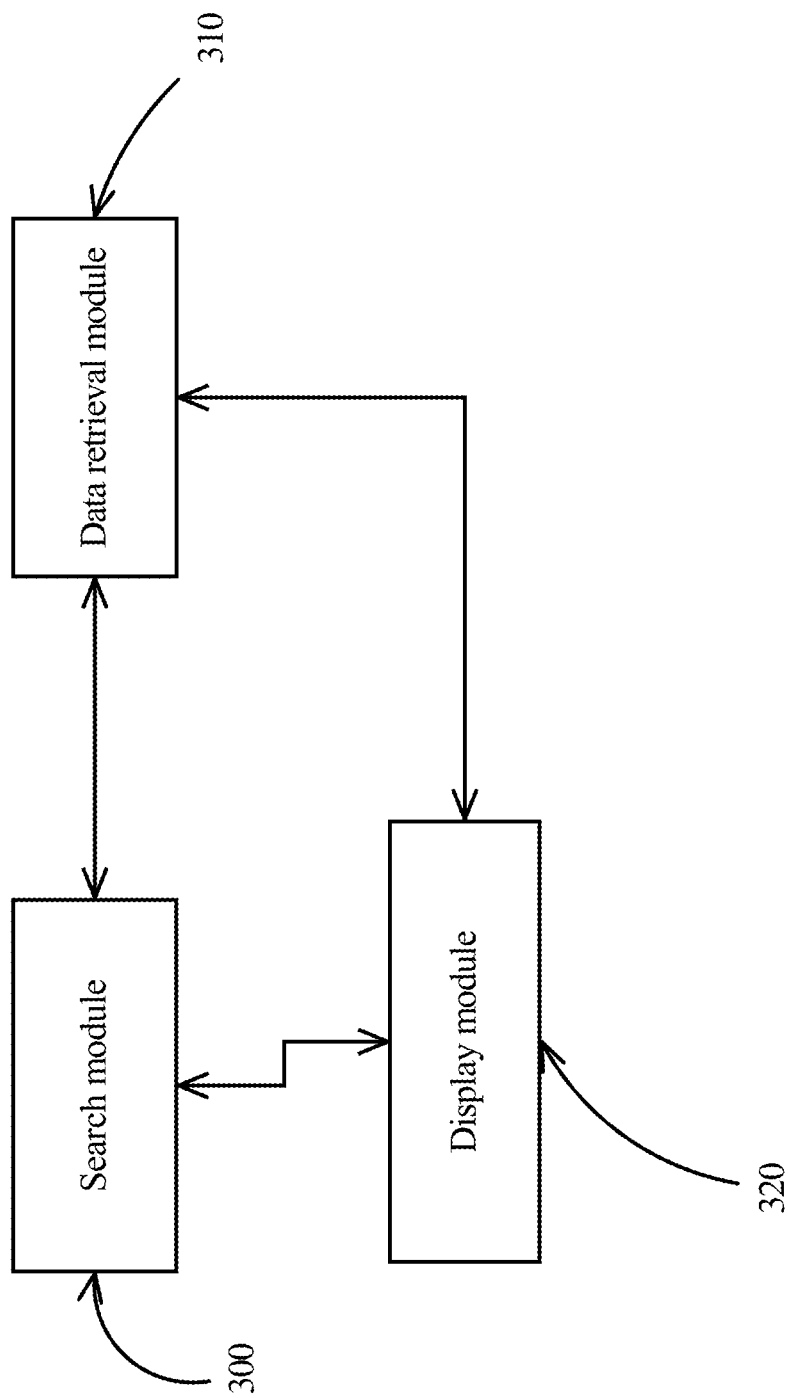
FIG. 6 is a block diagram of modules which may be used to practice the invention.

In another aspect of the invention, a system as illustrated in FIG. 6 executes the method as detailed above. Referring to FIG. 6, a search module 300 communicates with a data retrieval module 310 and a display module 320. The display module 320 also communicates with the data retrieval module 310. The search module receives the search indicators and, based on these search indicators, requests the data retrieval module to retrieve the relevant data or documents from the database servers. The data from the database servers may be the documents themselves so that the search module can scan/analyze each document. Once the search results have been determined, the search module can pass on the search result data to the display module. The display module can then determine how to present the various markers and identifiers on the user interface. This may involve determining the coordinates for each of the markers as well as for each of the identifiers. Such data may then be passed to the user computer.

As noted above, the display module also communicates with the data retrieval module. Such communication may be required if a user activates a marker on the user interface. The display module would receive a document's contents from the data retrieval module, process/format the content, and send the data to the user computer. Of course, instead of retrieving the relevant data from the database servers, the data retrieval module may cache such data (whether it be the contents of a document, a document's vector, or any data stored on the database server) for each of retrieval and processing.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g."C") or an object oriented language (e.g."C++"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques).

The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A method for displaying document search results to a user, the method comprising the steps of:
   a) receiving at least one search indicator;
   b) searching a plurality of documents for instances of said at least one search indicator;
   c) determining other indicators which occur with said at least one search indicator in documents found in step b);
   d) representing each document found in step b) with a marker and displaying markers for said documents on a user interface;
   e) on said user interface, clustering together markers for documents containing similar indicators to form at least one specific cluster of markers; and
   f) providing each specific cluster with at least one identifier visible to said user on said user interface, each identifier being for identifying an indicator occurring in documents represented by markers in said specific cluster; wherein
   a visible size of each identifier is related to a frequency of instances of an indicator represented by said identifier in said search results;
   said method further comprising the steps of, for each specific document in said plurality of documents,
   creating a semantic representation for said specific document;
   using said specific document's semantic representation to determine a vector representation of said specific document;
   using said vector representation for said specific document to determine a placement of a marker for said specific document on said user interface; and wherein a multidimensional scaling process is applied to vector representations of documents in said plurality of documents and to vector representations of said at least one search indicator to determine a placement of markers for said documents on said user interface; wherein said method projects said semantic representations of documents found in step b) to said user interface, and wherein on said user interface, each identifier is placed adjacent to markers associated with said identifier.

2. The method according to claim 1 further comprising the step of providing for user defined moving of said markers in said user interface.

3. The method according to claim 1 further comprising the step of providing for user defined moving of identifiers on said user interface.

4. The method according to claim 3 wherein user defined moving of identifiers also moves markers associated with said identifiers.

5. The method according to claim 1 wherein a user activation of a marker displays textual content of a document represented by said marker.

6. The method according to claim 5 wherein user activation of a marker displays other potential indicators in a document represented by said marker.

7. The method according to claim 1 wherein markers associated with a specific cluster is colored differently from markers associated with a different cluster.

8. Non-transitory computer readable media having encoded thereon non-transitory computer readable instructions which, when executed, implements a method for displaying document search results to a user, the method comprising the steps of:
   a) receiving at least one search indicator;
   b) searching a plurality of documents for instances of said at least one search indicator;
   c) determining other indicators which occur with said at least one search indicator in documents found in step b);
   d) representing each document found in step b) with a marker and displaying markers for said documents on a user interface;
   e) on said user interface, clustering together markers for documents containing similar indicators to form at least one specific cluster of markers; and
   f) providing each specific cluster with at least one identifier visible to said user on said user interface, each identifier being for identifying an indicator occurring in documents represented by markers in said specific cluster;
   wherein a visible size of each identifier is related to a frequency of instances of an indicator represented by said identifier in said search results;
   said method further comprises the steps of, for each specific document in said plurality of documents,
   creating a semantic representation for said specific document;
   using said specific document's semantic representation to determine a vector representation of said specific document;
   using said vector representation for said specific document to determine a placement of a marker for said specific document on said user interface; and wherein a multidimensional scaling process is applied to vector representations of documents in said plurality of documents and to vector representations of said at least one search indicator to determine a placement of markers for said documents on said user interface; wherein said method projects said semantic representations of documents found in step b) to said user interface, and wherein on said user interface, each identifier is placed adjacent to markers associated with said identifier.

9. The computer readable media according to claim 8 wherein said method further comprises the step of providing for user defined moving of said markers in said user interface.

10. The computer readable media according to claim 8 wherein said method further comprises the step of providing for user defined moving of identifiers on said user interface.

11. The computer readable media according to claim 10 wherein user defined moving of identifiers also moves markers associated with said identifiers.

12. The computer readable media according to claim 8 wherein a user activation of a marker displays textual content of a document represented by said marker.

* * * * *